S. C. MATTHEWS.
EDUCATIONAL DEVICE.
APPLICATION FILED JAN. 23, 1913.
1,071,358.
Patented Aug. 26, 1913.
2 SHEETS—SHEET 1.
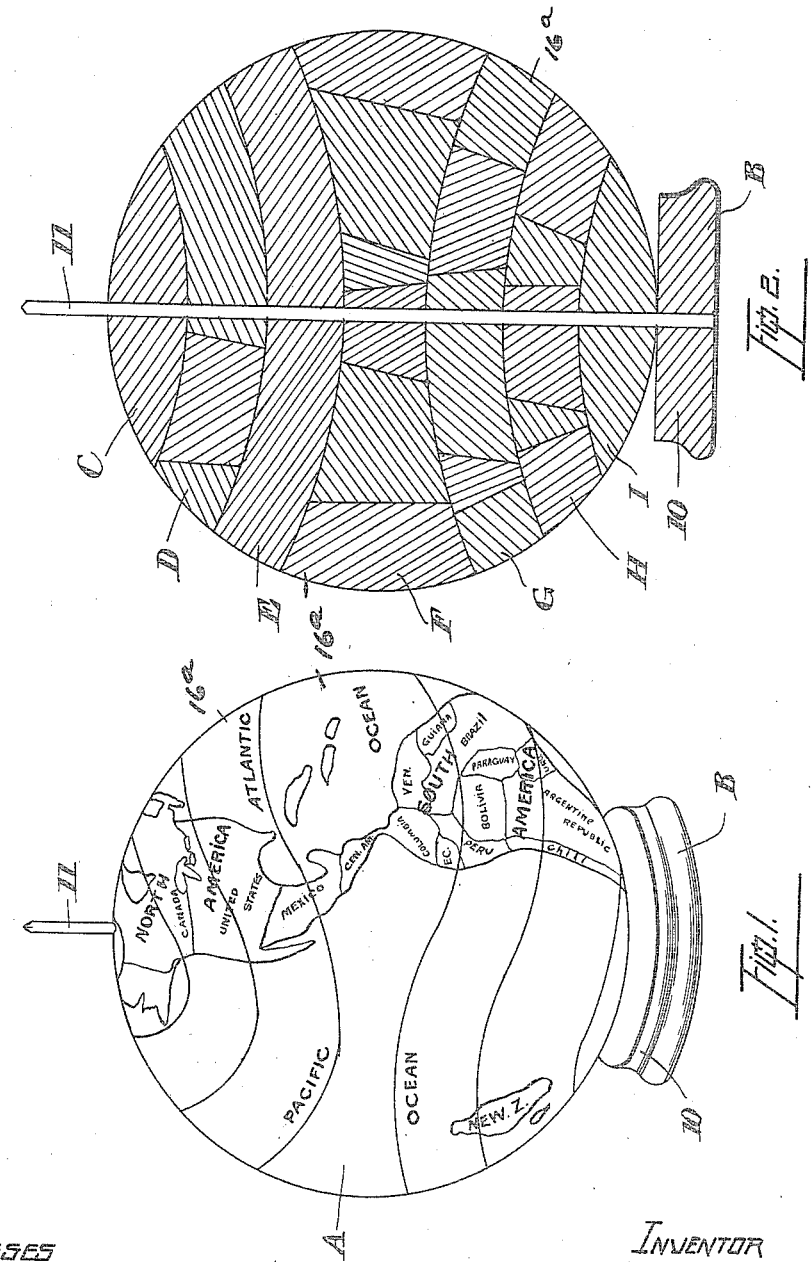
WITNESSES
INVENTOR
S.C. MATTHEWS
BY
ATT'Y.

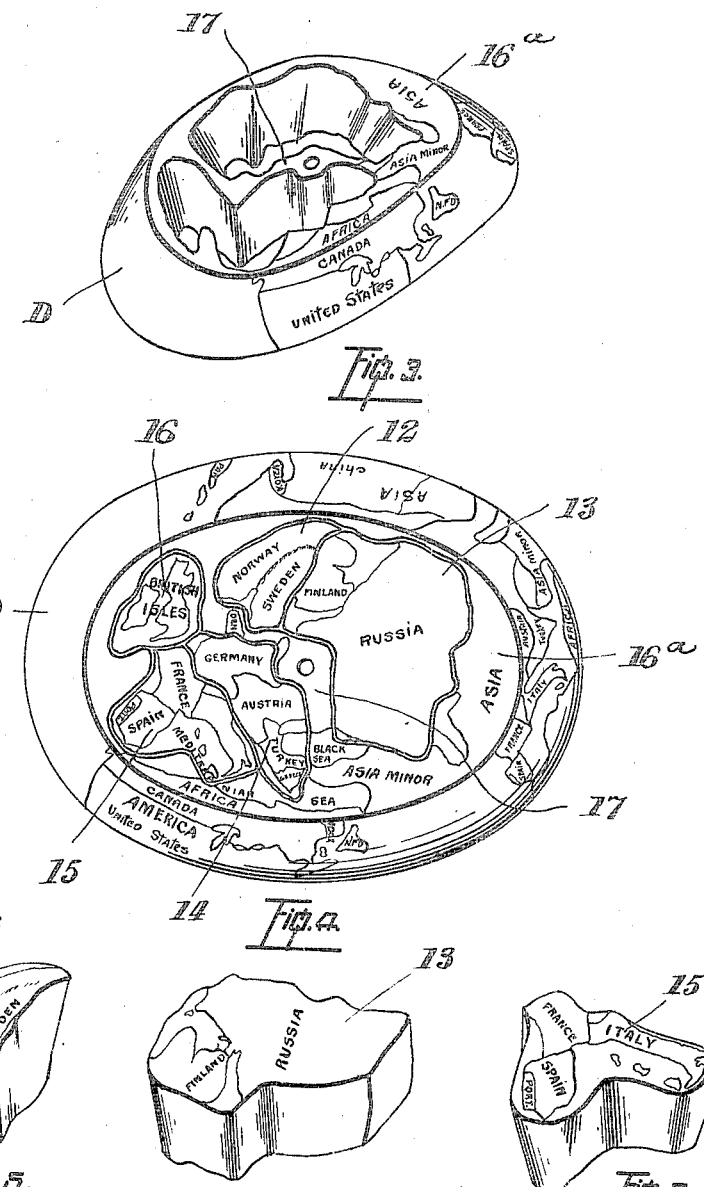

UNITED STATES PATENT OFFICE.

STEPHEN C. MATTHEWS, OF ST. JOHN, NEW BRUNSWICK, CANADA.

EDUCATIONAL DEVICE.

1,071,358.　　　　　Specification of Letters Patent.　　Patented Aug. 26, 1913.

Application filed January 23, 1913. Serial No. 743,810.

*To all whom it may concern:*

Be it known that I, STEPHEN CRESSWELL MATTHEWS, of the city of St. John, in the Province of New Brunswick, in the Dominion of Canada, have invented certain new and useful Improvements in Educational Devices, of which the following is the specification.

This invention relates to improvements in geographical puzzles, and the objects of the invention are to provide a simple and effective form of puzzle, which as well as affording amusement will be capable of imparting considerable instruction in geographical facts.

Puzzle map games have already been proposed, in which a flat map is divided along geographical divisions into interlocking sections, and it has already been proposed to divide a ball or globe into a plurality of interlocking sections. The present invention extends the scope of the geographical puzzle by combining it with a globe and also more accurately presents the geographical facts and enables a great number of different maps to be included in the same puzzle, for instance a map of the whole world may be included together with separate maps of the different continents.

The invention comprises a globe, preferably having a map of the world printed or embossed on the outer surface, the globe being divided into a plurality of layers. These layers are cut with curved surfaces and have maps represented thereon and are themselves divided into interlocking sections for the purpose and in the manner hereinafter set forth and described in the accompanying specifications or drawings.

In the drawings: Figure 1 is a perspective view of the puzzle. Fig. 2 is a vertical section through the same. Fig. 3 is a perspective view of one of the layers or sections with the inner pieces or sub-sections removed. Fig. 4 is the same view with the inner pieces or sub-sections in position. Figs. 5, 6, and 7 show sub-sections from the section shown in Fig. 4.

In the drawings like characters of reference indicate corresponding parts in all the figures.

Referring to the drawings, A represents a globe constructed of any suitable or convenient material, such for example as wood. B represents the supporting stand which may be of any form to suitably support the globe. As illustrated, it is formed with a base 10 and a pin 11 which extends through the axis of the globe and is adapted to correspond with the axis of the earth.

The surface of the globe in the embodiment of the invention illustrated herein has a map of the world represented thereon in any suitable way, as by painting, printing, lithographing, embossing or in any other way.

Following the present invention, the globe is divided into a plurality of sections C, D, E, F, G, H and I, the number of such sections being varied at will. The division line of these sections extends transversely across the globe and the division is made along concave lines, as indicated for the purpose hereinafter described, that is to say each divided surface will be of partially cylindrical form as shown in Fig. 2. The effect of this when the sections are separated, is to provide concave and convex surfaces thereto and when maps are printed or shown on these surfaces the ordinary flat idea given by most geographical maps is overcome.

Following the present invention, a map is shown on one of the surfaces of each of the sections. In the embodiment illustrated it would be convenient for instance to show the map of Europe on the section D, the map of North America on the section E, the map of Asia on the section F, the map of Africa on the section G, the map of South America on the section H, the map of Australia on the section I, leaving the section C blank. It is evident, however, that the manner of arrangement of the maps is purely arbitrary and may be varied to suit the place where the puzzle is to be used or sold. Another alternative method of using the puzzle would be to show the different States of one country on the different layers. Each layer or section is itself sub-divided into maps and minor sections and the manner of sub-division is similar in all the cases, and I will describe it only with respect to the section D. This section has represented on it the map of Europe. Following the present invention, this is divided into a plurality of minor or sub-sections 12, 13, 14, 15 and 16, after the manner of a jig saw puzzle, the sub-sections interlocking and being retained together by a major or endless member 16ᵃ of the layer. A transverse piece 17 is also left intact with the outer ring to form a connection with the pin 11. The edges of the sections constituting a layer incline with respect to each other, as clearly shown in the drawings, whereby any particular layer may be removed as a unit to expose the map on the face of the next adjacent layer. This construction also serves as a means to afford convenience in assembling the layers when forming a complete globe. The dividing lines of the sub-sections as far as possible coincide with the lines of geographical division, and it has already been pointed out that the curved surface of the section will overcome the flat idea usually present in maps. It will be evident that the number of sub-sections may be varied at will.

In using the puzzle all the sections and sub-sections are separated and the puzzle is to put them together again in the proper order to form the completed globe.

While the member A is preferably in the form of a globe, it will be appreciated that the feature of the invention relating to the sub-division of the different layers might be carried out if the member A were in other form, such for example as that of a cube, but in this case the educational value would be diminished.

It will be noted that the pin 11 corresponds with the axis of the earth. It may be stated that if desired the undersides of each of the sections may also have maps represented thereon.

As many changes could be made in the above construction and many apparently widely different embodiments of my invention within the scope of the claims could be made without departing from the spirit or scope thereof, it is intended that all matter contained in the accompanying specifications and drawings shall be interpreted as illustrative and not in a limiting sense.

What I claim as my invention is:

1. An educational device comprising a globe composed of independent non-interlocking sections having one or more of the sections formed itself in a plurality of interlocking parts having provision for holding the parts together for removal as a whole.

2. An educational device comprising a globe composed of independent non-interlocking transversely cut sections, one or more of the sections formed itself in a plurality of interlocking parts having provision for holding the parts together for removal as a whole.

3. A geographical puzzle comprising a member divided into a plurality of super-imposed layers, one or more of the layers having a map thereon and being divided into sub-sections.

4. A geographical puzzle comprising a globe divided into a plurality of super-imposed sections, one or more of the sections having a map thereon and being divided into sub-sections along the geographical division lines of the map.

5. A geographical puzzle comprising a globe divided transversely into a plurality of sections, one or more of the sections comprising an outer ring and a plurality of inter-locking sub-sections.

6. A geographical puzzle comprising a globe divided transversely into a plurality of sections, one or more of the sections comprising an outer ring and a plurality of inter-locking sub-sections, said sections each having a map thereon.

7. A geographical puzzle comprising a globe divided transversely into a plurality of sections, one or more of the sections comprising an outer ring and a plurality of inter-locking sub-sections, said sections each having a map thereon, and the face of the sections being concaved, or convexed.

8. A geographical puzzle comprising a member divided into a plurality of layers along a cylindrical surface, each layer having a map thereon and being formed in a plurality of sub-sections.

9. A geographical puzzle comprising a stand having a pin thereon, a member divided into a plurality of super-imposed sections, one or more of the sections comprising an outer ring and a transverse supporting member adapted to fit over the pin, and a plurality of sub-sections fitting within the ring.

10. An educational device comprising a body portion formed of main sections independent of each other and placed one upon the other, one or more of the sections being divided into major and minor parts the minor parts and major parts having provision for holding said parts together whereby a particular main section may be removed as a whole.

11. An educational device comprising a plurality of main sections to form a globe having on its outer surface a map, one or more of the main sections comprising an endless member and a plurality of sub-sections, one face of the main sections having thereon a map, the sub-sections dividing the map into divisions.

12. An educational device composed of a plurality of sections to form a body, the outer surface of the body being provided with symbols, one or more of the sections comprising a plurality of sub-sections, the face of each section being provided with symbols and the surfaces of adjacent sections fitting against each other, whereby a section may be removed to expose the symbols on the face of the next remaining section.

13. An educational device comprising a globe composed of independent non-interlocking sections having one or more of the sections formed itself in a plurality of interlocking parts one of the latter being endless, and all of the parts forming a section having provision for holding the parts together for removal as a whole.

In witness whereof I have hereunto set my hand in the presence of two witnesses.

STEPHEN C. MATTHEWS.

Witnesses:
HENRY S. CULVER,
J. M. SMITH.